(12) United States Patent
Trevethan

(10) Patent No.: US 12,021,971 B2
(45) Date of Patent: Jun. 25, 2024

(54) COMPUTER-IMPLEMENTED SYSTEMS AND METHODS FOR PERFORMING COMPUTATIONAL TASKS ACROSS A GROUP OPERATING IN A TRUST-LESS OR DEALER-FREE MANNER

(71) Applicant: nChain Licensing AG, Zug (CH)

(72) Inventor: Thomas Trevethan, London (GB)

(73) Assignee: nChain Licensing AG, Zug (CH)

( * ) Notice: Subject to any disclaimer, the term of this patent is extended or adjusted under 35 U.S.C. 154(b) by 0 days.

(21) Appl. No.: 17/901,794

(22) Filed: Sep. 1, 2022

(65) Prior Publication Data

US 2023/0147842 A1 May 11, 2023

Related U.S. Application Data

(63) Continuation of application No. 16/772,143, filed as application No. PCT/IB2018/059604 on Dec. 4, 2018, now Pat. No. 11,438,144.

(30) Foreign Application Priority Data

Dec. 13, 2017 (GB) ...................................... 1720753

(51) Int. Cl.
 *H04L 9/08* (2006.01)
 *G06Q 20/06* (2012.01)
 *H04L 9/14* (2006.01)

(52) U.S. Cl.
 CPC ......... *H04L 9/0819* (2013.01); *G06Q 20/065* (2013.01); *H04L 9/085* (2013.01);
 (Continued)

(58) Field of Classification Search
 CPC .............................. H04L 9/085; H04L 2209/46
 See application file for complete search history.

(56) References Cited

U.S. PATENT DOCUMENTS 11,438,144 B2 * 9/2022 Trevethan ............. H04L 9/0819
2016/0335924 A1 11/2016 Karashi et al.
(Continued)

FOREIGN PATENT DOCUMENTS

| CN | 106664205 A | 5/2017 |
|---|---|---|
| JP | 4216575 B2 | 1/2009 |

(Continued)

OTHER PUBLICATIONS

Antonopoulos, "Mastering Bitcoin—Unlocking Digital Cryptocurrencies," O'Reilly Media, Inc., Dec. 20, 2014, 282 pages.
(Continued)

*Primary Examiner* — David J Pearson
(74) *Attorney, Agent, or Firm* — Davis Wright Tremaine LLP

(57) ABSTRACT

A method is presented for secure determination of a solution (S) to a computational task by a pooled resource or group having a plurality of participants (P), the group operating in a trust-less, or dealer-free, system or manner. Access to a resource or reward is offered in exchange for the solution. Individuals generate their own key pair and use their public key to establish with the group an initial shared public key that they can all use to find a solution to the task. The resource or reward can be secured by the verified shared public key. Because the private keys of each participant were used in the determination of the initial shared public key that lead to the solution then participants must then collaborate to unlock the resource or reward because the corresponding shared private key can only be generated by all participants or a pre-agreed threshold of participants.

14 Claims, 5 Drawing Sheets

(52) U.S. Cl.
CPC ........... *H04L 9/14* (2013.01); *G06Q 2220/00* (2013.01); *H04L 2209/46* (2013.01); *H04L 2209/56* (2013.01)

(56) References Cited

U.S. PATENT DOCUMENTS

2017/0272246 A1 9/2017 Rane et al.
2017/0373845 A1 12/2017 Nix

FOREIGN PATENT DOCUMENTS

WO 2015160839 A1 10/2015
WO 2017187398 A1 11/2017

OTHER PUBLICATIONS

Asharov et al., "Multiparty Computation with Low Communication, Computation and Interaction via Threshold FHE," retrieved from https://eprint.iacr.org/2011/613.pdf, Jun. 9, 2012, 48 pages.
Changgen et al., "Threshold Signcryption Scheme Based on Elliptic Curve Cryptosystem and Verifiable Secret Sharing," Wireless Communications, Networking and Mobile Computing, Sep. 23-26, 2005, 4 pages.
Feldman, "A Practical Scheme for Non-interactive Verifiable Secret Sharing," Massachusetts Institute of Technology, 1987, 11 pages.
Goldfeder et al., "Securing Bitcoin Wallets via a New DSA/ECDSA Threshold Signature Scheme," retrieved from https://www.cs.princeton.edu/~stevenag/threshold_sigs.pdf, 26 pages, 2015.
International Search Report and Written Opinion dated Mar. 11, 2019, Patent Application No. PCT/IB2018/059604, 13 pages.
Nakamoto, "Bitcoin: A Peer-to-Peer Electronic Cash System," Bitcoin, Oct. 31, 2008, https://bitcoin.org/bitcoin.pdf, 9 pages.
Narayanan et al., "Bitcoin and Cryptocurrency Technologies," Princeton University Press, Feb. 9, 2016, 308 pages.
Nchain, "Threshold (Signature) of Greatness—Dr. Craig Wright—Hong Kong 2017," https://www.youtube.com/watch?v=GUg2mocV9TI, Sep. 26, 2017, 17 pages.
Nishide et al., "Distributed Paillier Cryptosystem without Trusted Dealer," WISA, 2010, 18 pages.
Pedersen, "A Threshold Cryptosystem without a Trusted Party," Aarhus University, Computer Science Department, 1991, 5 pages.
SAMR7, "Vanitygen: Vanity Bitcoin Address Generator/miner [v0.22]," Bitcoin Forum, retrieved from https://bitcointalk.org/index.php?topic=25804.0, Apr. 10, 2018, 8 pages.
Satoshi et al., "Connection Limits," Bitcoin Forum, Aug. 9, 2010, https://bitcointalk.org/index.php?topic=741.0; prev_next=prev, 2 pages.
Thepiachu, "Vanity Pool—Vanity Address Generator Pool," Bitcoin Forum, retrieved from https://bitcointalk.org/index.php?topic=84569.0, Apr. 6, 2018, 6 pages.
UK Commercial Search Report dated Apr. 13, 2018, Patent Application No. GB1720753.1, 5 pages.
UK IPO Search Report dated Jun. 14, 2018, Patent Application No. GB1720753.1, 4 pages.

* cited by examiner

Figure 1

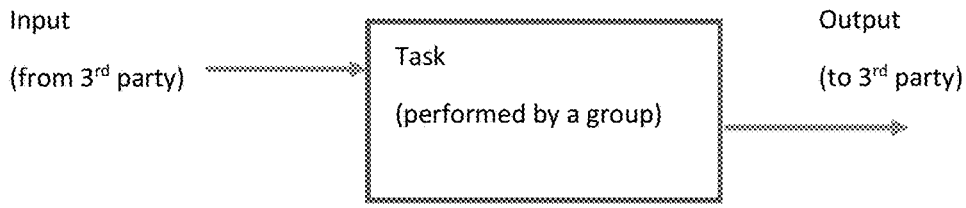

Figure 2

Figure 3

| Pattern | Difficulty | Average time |
|---|---|---|
| 1BXXXXXXXXXXXXXXXXXXXXXXXX | 22 | 0.2 ms |
| 1BiXXXXXXXXXXXXXXXXXXXXXXX | 1,330 | 1.3 ms |
| 1BitXXXXXXXXXXXXXXXXXXXXXX | 77,178 | 78 ms |
| 1BitcXXXXXXXXXXXXXXXXXXXXX | $4.48 \times 10^6$ | 5 s |
| 1BitcoXXXXXXXXXXXXXXXXXXXX | $2.60 \times 10^8$ | 4 minutes |
| 1BitcoiXXXXXXXXXXXXXXXXXXX | $1.51 \times 10^{10}$ | 3 hours |
| 1BitcoinXXXXXXXXXXXXXXXXXX | $8.73 \times 10^{13}$ | 1 week |
| 1BitcoinCXXXXXXXXXXXXXXXXX | $2.94 \times 10^{15}$ | 1 year |
| 1BitcoinCaXXXXXXXXXXXXXXXX | $1.70 \times 10^{17}$ | 60 years |
| 1BitcoinCasXXXXXXXXXXXXXXX | $9.39 \times 10^{18}$ | 3,500 years |
| 1BitcoinCashXXXXXXXXXXXXXX | $5.73 \times 10^{20}$ | 200,000 years |

_COMPUTER-IMPLEMENTED SYSTEMS AND METHODS FOR PERFORMING COMPUTATIONAL TASKS ACROSS A GROUP OPERATING IN A TRUST-LESS OR DEALER-FREE MANNER_

CROSS REFERENCE TO RELATED APPLICATIONS

This application is a continuation of U.S. patent application Ser. No. 16/772,143, filed Jun. 11, 2020, entitled "COMPUTER-IMPLEMENTED SYSTEMS AND METHODS FOR PERFORMING COMPUTATIONAL TASKS ACROSS A GROUP OPERATING IN A TRUST-LESS OR DEALER-FREE MANNER," which is a 371 National Stage of International Patent Application No. PCT/IB2018/059604, filed Dec. 4, 2018, which claims priority to United Kingdom Patent Application No. 1720753.1, filed Dec. 13, 2017, the disclosures of which are incorporated herein by reference in their entirety.

FIELD OF INVENTION

This specification relates generally to computer-implemented methods and systems suitable for implementation in a computer processor, such as a node of a blockchain network, or a group of such processors. Improved methods of performing computational tasks in a pool or group, or distributing the task within a pool, for increasing the security and efficiency of computations are described. The invention is particularly suited to a trust-less collaboration between participants who work in parallel to determine a solution to a task.

BACKGROUND OF INVENTION

In this document we use the term 'blockchain' to include all forms of electronic, computer-based, distributed ledgers. These include consensus-based blockchain and transaction-chain technologies, permissioned and un-permissioned ledgers, shared ledgers and variations thereof. The most widely known application of blockchain technology is the Bitcoin ledger, although other blockchain implementations have been proposed and developed. While Bitcoin may be referred to herein for the purpose of convenience and illustration, it should be noted that the invention is not limited to use with the Bitcoin blockchain and alternative blockchain implementations and protocols fall within the scope of the present invention. The term "user" may refer herein to a human or a processor-based resource.

A blockchain is a peer-to-peer, electronic ledger which is implemented as a computer-based decentralised, distributed system made up of blocks which in turn are made up of transactions. Each transaction is a data structure that encodes the transfer of control of a digital asset between participants in the blockchain system, and includes at least one input and at least one output. Each block contains a hash of the previous block so that blocks become chained together to create a permanent, unalterable record of all transactions which have been written to the blockchain since its inception. Transactions contain small programs known as scripts embedded into their inputs and outputs, which specify how and by whom the outputs of the transactions can be accessed. On the Bitcoin platform, these scripts are written using a stack-based scripting language.

In order for a transaction to be written to the blockchain, it must be i) validated by the first node that receives the transaction—if the transaction is validated, the node relays it to the other nodes in the network; and ii) added to a new block built by a miner; and iii) mined, i.e. added to the public ledger of past transactions.

Supporting the blockchain is computationally expensive. By way of example, the current difficulty of mining a block is such that individual miners working alone require specialist dedicated hardware and resources. Computational tasks and associated costs are often distributed and shared between a plurality of individuals or organisations, collectively referred to as a 'pool'. Using a blockchain mining pool as an example, the task of determining the 'Proof of Work' when adding a new block to the blockchain is managed by an individual or company, hereinafter referred to as a pool 'operator' or 'dealer', who is in control of a pool server. The dealer acts on behalf of the pool and receives a block reward via a specific address, said reward is then shared with individual miners based on the shares they submit i.e. their contribution.

Unfortunately, central control by a dealer makes a mining pool susceptible to cheating and can be construed as a single point of failure because the server may crash, need maintenance or be attacked. Peer to peer mining pools, which eliminate the need for a dealer, compromise on performance.

An example of another known computationally expensive task is the determination of a specific address for transactions on the blockchain, often referred to as 'vanity addresses', which can be used to enhance and/or improve security measures. Determining a vanity address requires both elliptic curve multiplication and hashing. While individuals can perform calculations to determine a vanity address the task of determining longer vanity address patterns can be distributed across a pool.

Unfortunately, distributing the task of determining a vanity address is fraught with risks associated with corruption. When the vanity address is determined the private and public keys of that address are known, making the system insecure. Using known security techniques in communications between collaborators in a pool using known techniques will diminish the performance capabilities of the group. Furthermore, the system remains susceptible to corruption and/or free-riding.

SUMMARY OF INVENTION

Overall, the invention resides in a novel approach for secure determination of a solution (S) to a computational task. The task requires an answer to be determined. Access to a resource or reward is offered in exchange for the solution. The resource or reward is secured by a public key, which is unlockable or releasable by using the corresponding private key. The invention allows the task to be tackled or solved by a pooled resource or group having a plurality of participants, which can be a dealer-free threshold signature group.

The method enables individuals in said group to work together in a trust-less, or dealer-free manner. To achieve this, individuals generate their own key pair and use their public key to establish with the group an initial shared public key that they can all use, in parallel, to find a solution to the task. Their own private keys remain secret and, therefore, the collaboration is trust-less, and operates efficiently, because a verified shared public key is created using the initial shared public key that was used when a solution is found and verified. The resource or reward can be secured by the verified shared public key. Because the private keys of each participant were used in the determination of the initial shared public key that lead to the solution then participants must then collaborate to unlock the resource or reward because the corresponding shared private key (or a corresponding signature) can only be generated by all participants or a pre-agreed threshold of participants. Efficiency is achievable by using an initial shared public key and calculating with the group a different shared public key, which is verified shared public key, after the solution has been found.

The invention enables the task to be trust-less by using the homomorphic properties of elliptic curves when applying Shamir's secret sharing scheme.

The inventive concept resides in the secure, trust-less and efficient way in which a group can collaborate. The invention can be agnostic to the task.

Thus, in accordance with the present invention there is provided a method and system as defined in the appended claims.

Thus, it is desirable to provide a computer-implemented method for secure determination of a solution to a computational task by a pooled resource or group having a plurality of participants, said group operating in a trust-less, or dealer-free, system or manner, the method comprising: establishing or joining a group with n participants, wherein n≥2; generating an initial private key share and initial public key share and establishing an initial shared public key with the group; performing the task and searching for the solution that determines an answer to the task using an intermediate private key and the shared public key of the group; finding and sharing the solution with the group, or receiving the solution from another participant, thus enabling the group to verify the solution to the task; calculating with the group a verified shared public key using the initial shared public key and the intermediate private key that provided the solution; constructing a verified secret key share by summing the initial private key and the intermediate private key that provided the solution; collaborating with all of the other participants, or a threshold number of participants, to construct a verified shared secret key for the verified shared public key, using verified secret key shares, wherein the verified shared secret key is used as a code to enable the group to operate collectively to unlock or access a resource or stage of a process. It is to be noted that the verified shared public key is calculated after the solution has been found.

The method can further comprise receiving from a client or participant the task and a client public key derived from a client's secret key, wherein the client's public key is used in the determination of the solution to the task. In this way the task can be encrypted such that only the client or participant can determine the solution.

The resource or rewards, which can be access to a stage of a process or could be a financial reward, is locked or secured by the verified shared public key and the verified shared secret key can be used as a code to enable the group to operate collectively to unlock or access a resource or stage of a process. A group of n participants operating collectively requires either all participants in the group to collaborate or a pre-agreed threshold m of participants to collaborate, where m≤n.

Performing the task and searching for the solution can include: using the intermediate private key to create an intermediate public key that is added to the initial shared public key to create a temporary public key that is processed to determine whether the intermediate private key was a solution that determined the answer sought; and if the answer is not determined, incrementing the value of the intermediate private key and repeating the process until the solution is determined, and the answer is proven.

Using the intermediate public key, for determining the solution only, can enable the participants to work in parallel without the need to generate a new shared public key at each step. Instead, a verified shared public key is created when the solution is known and verified by all participants. The initial shared public key and the verified shared public key can be generated once.

The task can require at least one group member to find a solution that, when processed, produces a cryptocurrency address having a specified pattern. The cryptocurrency address can be a Bitcoin address, as per the examples herein.

The task can require the determination of a set pattern (A), and said set pattern originates from a third-party or another participant, and wherein the third-party generated a third-party secret key ($sk_c$) and provides to the group a corresponding third party public key, wherein $pk_C=sk_C \times G$, and G is an elliptic curve generator, and × is an elliptic curve point multiplication, and receiving the third party public key, and determining the set pattern using the third party public key with an incremental variable (i), such that $pk=pk_C+i \times G$ when the set pattern is determined, sending to the third-party the incremental variable (i) that enabled determination of the solution, such that the third party can verify the solution using their random secret key ($sk_c$) $sk=sk_C+i$, where $pk=sk \times G$ due to the homomorphic properties of elliptic curve point multiplication.

The group of n participants can generate the initial shared public key and/or verified shared public key through a secure multiparty computation (MPC). The initial shared public key can be established amongst the group using Shamir's secret sharing scheme.

The initial and/or shared secret key can be established amongst the group using Shamir's secret sharing scheme, wherein a trust-less relationship can be established between each participant $P_i$ by generating their own random degree t polynomial $f_i(x)$, and then securely sending $f_i(j)$ to each other participant $P_j$, each participant summing all the received points $f_1(i)+f_2(i)+ \cdots +f_n(i)$ to obtain their secret share $s_i=f(i)$, which is the $P_i$ point on the shared polynomial $f(x)$.

Following creation of the initial private key share the initial public key share can be computed using an elliptic curve generator G, as $b_i s_n \times G$, wherein the interpolation coefficient $b_i$ is:

$$b_i = \prod_{j \in U, j \neq i} \frac{i}{j-i},$$

and
the initial public key shares are then broadcast to all participants and the initial shared public key is then calculated as the sum of any t+1 shares according to:

$$pk = \sum_{i=1}^{t+1} b_i s_i \times G$$

The task can be received from a client or participant, said task can be to find a private key for a cryptocurrency or Bitcoin address having a specified pattern therein. The intermediate private key can be randomly generated and an intermediate public key can be a multiple of the seed number by with an elliptic curve generator, and the temporary public key is added to the shared public key and processed to produce a cryptocurrency address, such as a Bitcoin address.

Upon all participants having the seed number that enabled the solution, the verified shared public key can be calculated from $$pk_v = pk_0 + r_v^0 \times G.$$

Each participant calculates their verified secret key shares of each participant, calculated from $s_v'' = s_O'' + r_v^0$ enabling the group of participants to construct a shared verified secret key, or generate a valid digital signature.

The method can further comprise sharing with the group, periodically, intermediate results that are demonstrable of the computational resource applied to the task. The intermediate results can correspond to a portion of the answer. The intermediate results can have a proportional level of difficulty. One or more participants can assess the computational resource applied by a fellow participant based on the frequency and/or difficulty of intermediate results submitted.

In another aspect, the invention resides in a computer readable storage medium comprising computer-executable instructions which, when executed, configure a processor to perform any of the methods claimed herein.

In another aspect, the invention resides in an electronic device comprising: an interface device; one or more processor(s) coupled to the interface device; a memory coupled to the one or more processor(s), the memory having stored thereon computer executable instructions which, when executed, configure the one or more processor(s) to perform the method of the claims herein.

In another aspect, the invention resides in a node of a blockchain network, the node configured to perform any of the methods claimed herein.

In another aspect, the invention resides in a blockchain network having a node as claimed herein.

It is to be noted that this specification has referred to the use of random numbers. The invention can additionally or alternatively use pseudo-random numbers.

Such an improved solution has now been devised.

BRIEF DESCRIPTION OF THE DRAWINGS

These and other aspects of the present invention will be apparent from and elucidated with reference to, the embodiment described herein. An embodiment of the present invention will now be described, by way of example only, and with reference to the accompany drawings, in which:

FIG. 1 is an element of a process in which a task is addressed using the system or method of the invention;

FIG. 2 is an address for use on the blockchain having a set human readable pattern "nChain" therein;

FIG. 3 is a table summarising a difficulty level and average time expected to be taken to determine an address with various set patterns using a standard computer processing unit (CPU) using expected at a rate of 1 million keys per second;

FIG. 6a is a flow chart indicating how participants initially collaborate to establish a shared public key, while

DETAILED DESCRIPTION

Overview

Figure 4:
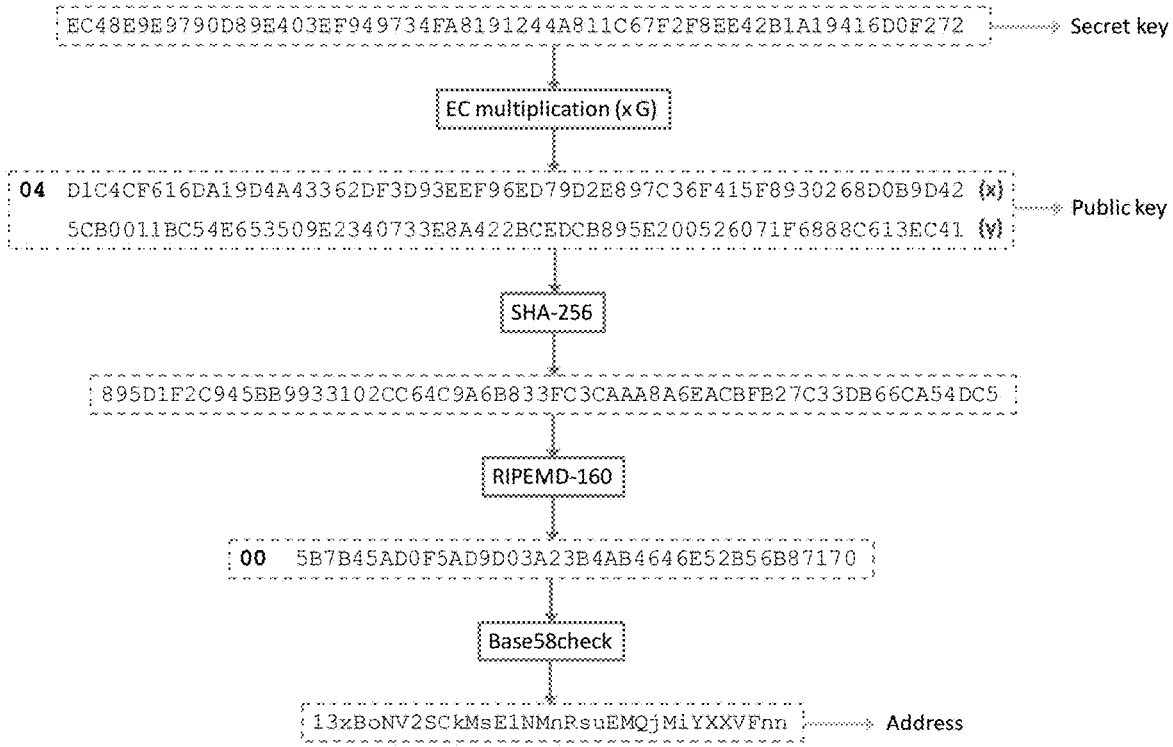
FIG. 4 is a flow-chart indicating the steps taken to determine an address for use on the blockchain from an example of a specific secret key.

In this specification a solution to the problem of sharing a computational task in a secure, efficient and dealer-free or trust-less system is described. The method, and system for implementing the method, takes an input and determines an output.

Computational Task Overview

FIG. 1 is the simplest illustration of a system according to the invention, in which an input or requirement is set, and a task must be performed to provide an output.

The input can be the output from an earlier task, or can be set by a third party outsourcing a task. The task, in theory, can be performed by one individual or entity. The invention, however, is concerned with a number of parties, such as individuals or entities, collaborating on the task to generate the output. The output can be used as the input to a subsequent task and, therefore, can be embodied as a code or set of data.

A third party setting the input to a task and receiving the output can do so openly, such that the solution and answer is known to said third party and at least one of the group collaborating on determining the output, or solution.

Alternatively, should a third party client wish to assign the task securely, they can generate a secret key ($sk_c$) and corresponding public key ($pk_c$). The client's public key can be provided to the group (G) of participants (P) for use in determining the solution and answer to the task set. The participants use a new public key (determined from a secret key $sk_G$) in the determination of the solution, which is achieved by adding a group public key ($pk_G$) to the client public key ($pk_c$). To be clear, the solution can be determined using the client's public key added to a shared public key generated by the group i.e. $pk_c + pk_G$.

When the group determine a solution and answer, they collaborate to generate a code that enables the group, for example, to share with the client the secret key ($sk_G$) that corresponds to the group public key ($pk_G$) that lead to the determination of the solution.

The client can then add said group secret key ($sk_G$) to their own secret key ($sk_c$) to determine the solution. In this manner, only the client knows the secret key that enables the solution to the task[8].

For simplicity, examples below will assume that a third party client (providing a task to a collaboration to solve) trusts the collaboration and does not provide a 'client' public key ($pk_c$) to the group for the encryption of the solution.

Example Computational Task

By way of example, the method, and system for implementing the method, is described using the determination of a vanity address by a dealer-free threshold signature group. This task is represented in FIG. 1 and is explained independently from the secure assignment of the task, and delivery of result, from a third party (or any other process).

The method involves a group of participants who generate a shared public key via a secret sharing scheme without the use of a trusted third party dealer. The method utilises arithmetic properties of secret sharing polynomials and the homomorphic properties of elliptic curve multiplication to enable parallel determination for vanity address strings.

The method enables the distribution of the computational task, such as determining a vanity address, without any loss of security. A dealer or similar trusted party is not needed. The method can additionally enable an assessment or measurement of the computational resource utilised by each participant on a group task.

FIG. 2 shows an address for use in a cryptocurrency system such as Bitcoin. The address is an identifier that defines a destination for the payment of cryptocurrency tokens. In the Bitcoin protocol, an address is a 160-bit hash of the elliptic curve public key corresponding to a private key generated by the party receiving a payment. Sending cryptocurrency payments to an address instead of a full public key means that the corresponding full public key is not revealed on the blockchain until an output (unspent transaction—UTXO) is spent (i.e. as part of the scriptSig in P2PKH). This offers protection against potential future weaknesses in elliptic curve cryptography that may arise due to the rapid advancement of quantum computing.

Bitcoin addresses are typically converted to an alpha-numeric format using a custom Base58Check encoding scheme, which results in a text string that is 25-34 characters in length. The Base58 encoding scheme is employed to make addresses both compact and human readable: in this format, payment addresses can easily be made available (on a website, for example) for copying or transcribing.

The human-readable text string of FIG. 2 is derived from a random private key in a deterministic way. It is possible, therefore, to perform calculations repeatedly to find a private key that results in particular pre-determined sub-string in the Base58 encoded address. This kind of intensive search is often referred to as a "brute-force" search.

The address of FIG. 2 is known as a "vanity address" and can be used to make addresses more identifiable and less susceptible to fraudulent activity. For example, an address can be determined that starts with a personal or company name, e.g. 1David, or some other pre-determined string. In this case, an address with the term "nChain" has been determined from a private key.

Determining a vanity addresses requires a probabilistic search of the private key space, and therefore significant computational expense, depending on the required substring pattern. The computational expense of finding a required sub-string is quantified as the difficulty (D), which is defined as the expected (average) number of random private keys that must be tried (i.e. converted to an address).

FIG. 3 shows a table listing the difficulty of finding addresses beginning with a specific case-sensitive sub-string of different lengths, and the corresponding average search time based on search speed of 1 million keys per second. Even with specialist hardware, such as graphic processing units (GPUs) or application specific integrated circuits (ASICs) the search remains computationally expensive for long strings and parallel searching is faster.

FIG. 4 illustrates the steps taken to establish an address from a private or secret key, said secret key being a 256 bit secure random number, which is the private key (and which must be kept secret)[2]. The corresponding full public key is then generated via point multiplication on the Secp256k1 elliptic curve (×G), which results in two 256 bit numbers (for the x and y coordinates of the elliptic curve point). These coordinates are concatenated, and prefixed with 0x04, resulting in a 520 bit number. The public key is then hashed with the SHA-256 function to result in a 256-bit number, which is then hashed with the RIPEMD-160 function to result in the 160-bit address, prefixed with a version byte (0x00 for the main Bitcoin network). The address can then be converted into a human readable representation using Base58check encoding. This encoding features a set of 58 alpha-numeric symbols: numbers, upper and lower case letters (the 0, O, I (Uppercase-I) and 1 (Lowercase-L) characters are not used as they can be difficult to distinguish in some fonts). In addition, a 4-byte error checking code is added to the end of the address to automatically detect typographical errors (and prevent funds being sent to unspendable addresses)[3].

Figure 5:
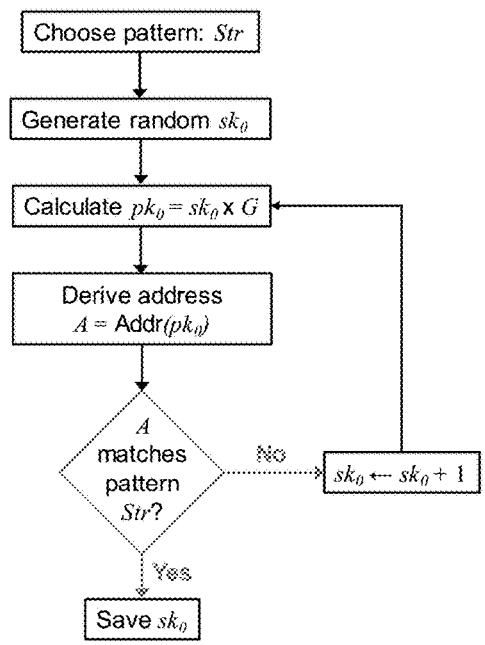
FIG. 5 is a flow-chart indicating the calculations for deriving a vanity address and encompasses steps performed in FIG. 4.

FIG. 5 shows the actions taken to determine a Base58 encoded addresses containing specific sub-strings (or patterns) that can be determined through a brute-force search of the private key space[1]. The pattern (Str) considered is part of the client answer ($A_c$) being sought. The values used in the calculations used to determine the answer, including the values that enabled the answer to be determined are considered a components of the solution (S). The solution is a private key which, when processed using steps disclosed in FIG. 4, lead to an address ($A_c$) having the desired string.

In FIG. 5, an answer ($A_c$) in the form of a blockchain address having a pattern in which the first four characters of the address are to be 'Coin', is set. The term 'Coin' is the string (str) of characters sought. Following the steps of FIG. 4, a random number representing a secret or private key ($sk_0$) is generated. A public key ($pk_0$) is calculated by multiplying the secret key with an elliptic curve generator (G). An encoded address in Base58check is determined from the public key and if the pattern (str) of the address has 'Coin' in the first 4 letters then the secret key ($sk_0$) is the solution. Otherwise, the secret key ($sk_0$) is incremented by one i.e. +1 bit, and the calculation of another public key established and the process repeated.

This probabilistic generation of the answer ($A_c$) often requires millions of cycles of the process and the difficulty increases as the length of pattern sought increases, as suggested in FIG. 3. The search is probabilistic because the output of a hash function can be considered random, assuming a random oracle model. The expected number of attempts or cycles required will depend on the complexity of the pattern. A vanity address is as secure (unbreakable) as an address created from any other random key, irrespective of the search complexity.

Although the invention is described herein using a computational task to determine a solution (S), which is the determination of the answer ($A_c$), in this case a vanity address—the secure and efficient parallelisation of performing such as task is not limited to the determination of vanity addresses for Bitcoin use. The solution can be used to access an asset or resource.

Known Parallel Searching

Performing a task collaboratively, using a pooled resource of a plurality of participants (P) in a group is known from blockchain mining. In a mining pool, a dealer coordinates the participants and establish a private and public key pair. Shares of the private key are then distributed by the dealer to the participants. Further, it is possible for a congresses, or groups of participants, to have their funds collectively secured with a single public key or address. In a mining pool and congress scenario a signature corresponding to the shared public key can be produced via a threshold signature scheme thus enabling the group, and a part thereof, to collectively access funds or rewards.

However, for congresses to be completely trust-less and secure, the shared public key (and corresponding address) must be generated without a trusted third party ('dealer').

A dealer-free secret sharing protocol requires significant communication between the participants in multiple rounds.

This takes a significant amount of time to complete — typically seconds to minutes, depending on network latency. Further, in a dealer-free secret sharing protocol, a new shared public key would be required each time a participant used their share of the shared public key to attempt to determine a solution to a task. With each attempt at determining a vanity address pattern, a new shared public key is required.

Each time a participant wishes to verify progress or share with the group a status update or a potential solution during a collaborative search on a computational task, such as a vanity address search, then a new dealer-free shared public key is required at each step, which makes the task is completely infeasible. In other words, a task such as a search has a plurality of steps and a group collaborating on the task collectively perform each step, in parallel. To maintain a secure yet trust-less relationship the group are required to collectively generate a new public key at each step of the task. For example, assuming a shared public key generation time of 10s, to find an address beginning with a pattern of just 4 characters ('1CoinXXX . . . ') would take over a year (compared to a few seconds for a single party with an individual private key). It is for this reason that the invention establishes a second shared public key that is based upon an original public key and a solution.

Improved Parallel Searching—Generating a Shared Public Key

The invention relates to collaborative working in a trust-less system. Without a dealer the group must establish a mechanism for securely sharing the solution and/or answer to the set task. To achieve this, a dealer-free threshold group is established.

The group has a number (n) of participants (P). Each participant establishes a secret share ($s_o^n$) of a shared secret, or private, key. The shared secret key can be determined from a threshold (m) number of secret shares (wherein m≤n). The shared secret can be established when it is constructed from a threshold of shares, although it is not necessary to do so.

Before the secret share ($s_o^n$) of a shared secret key is established, the group agree on a generator and other parameters that define an elliptic curve standard (G). The generator or point is used, as part of elliptic curve point multiplication, to convert secret keys into public keys. In group multi-party calculations (MPC), it is used as part of the process of deriving the shared public key from the individual secret key shares. Said generator can then be used by each participant to establish a secret share ($pk_1$) of a secret key and a corresponding share of a public key that is used to generate a shared public key ($pk_O$). The group calculate an initial shared public key ($pk_O$) using their secret shares. The group can use a secure multiparty computation (MPC) to achieve this.

It is to be noted that the shared secret key does not need to be calculated because it will not be used by the group. Later in the process each participant's share of the shared secret key is used to unlock an asset.

The shared public key ($pk_O$) can be used to determine a solution/answer and the output sought by the group, which is an asset to be accessed, is placed under the control of a shared group key, and a corresponding address. The shared public key ($pk_O$) enables the group to collaborate in a completely trust-less way, because the secret, or private, key that is required to access the asset can only be determined (or a signature generated) when a threshold of participants collaborate.

The establishment of each participant's share of the shared secret, and the shared public key uses Shamir's secret sharing scheme (SSSS)[4], which employs the fact a polynomial of degree t can fit or match to any set of t+1 points. A polynomial f(x) of degree t is created where the shared secret key is defined as the constant term ($a_0$=f(0)) and the remaining coefficients are securely generated random numbers. A number n of distinct arbitrary points on the polynomial are the secret shares for each participant. If m=t+1 or more of the participants then combine their points, there is sufficient information to fit (via Lagrange interpolation) the order t polynomial to these points, and $a_0$=f(0) is revealed as the shared secret. This scheme enables the sharing of a single private key among an arbitrarily large number of parties with any threshold.

Removing a dealer and making the system trust-less can be achieved[5]. Rather than a dealer creating the initial polynomial and distributing the secret shares, each participant $P_i$ generates their own random degree t polynomial f(x) and then securely sends $f_i(j)$ to each other participant $P_j$. Each participant $P_i$ then sums all the received points i.e. $f_1(i)+f_2(i)+ \ldots +f_n(i)$, to obtain their secret share $s_i$=f(i), which is the $P_i$ point on the shared polynomial f(x).

After the secret shares have been created, the shared public key ($pk_O$) corresponding to the shared secret key is computed using the elliptic curve generator G). The shared secret key, however, is not known and does not need to be calculated, as will become clear below.

Participants $P_i$ then compute their public key shares as $b_i s_i \times G$, where the interpolation coefficient:

$$b_i = \prod_{j \in U, j \neq i} \frac{i}{j-i}$$

These public key shares are then broadcast to all participants and the shared public key ($pk_O$) is then calculated simply as the sum of any t+1 shares:

$$pk_o = \sum_{i=1}^{t+1} b_i s_i \times G$$

Each participant can verify that all the public key shares received are consistent.

When the group collaborate or a threshold number of participants of the group collaborate then a code can be generated, said code being the solution that in these examples is a private key. The collaborative generation of the code enables the group to access or unlock an asset, or function to close a stage in process, such as the completion of a task shown in FIG. 1. The task completed can be one of a plurality of tasks in a process, such as an encryption process.

By way of example, the signature corresponding to an address can be used to unlock funds and those funds can only be unlocked when a threshold of m participants of the group cooperate to either recreate the shared secret key or, more securely, collectively sign a spending transaction using a threshold signature scheme[6].

Improved Parallel Searching—Collaborative Calculation

The determination of a solution by a group of participants in a trust-less manner is described, by way of example, in relation to finding a secret key that, when processed, produces a Bitcoin address. The steps taken to maintain secure and efficient collaboration in a trust-less manner can be applied to any cryptocurrency with an alpha-numeric address format and exponentiation based public key signatures, or any computational process or task.

In line with the example computational task, the invention is illustrated by the determination of a vanity address. Elliptic curve (EC) operations are performed using the parameters defined by the Secp256k1 curve[7], which is employed in Bitcoin. This standard specifies (in addition to the curve parameters) the generator point G and order p. If not specified otherwise, all operations (including polynomial) are performed over modulo p, and all secret keys are 256 bit numbers. All public keys are EC coordinates.

The protocol operates between a group of participants (the 'threshold group') and it is assumed that all participants can authenticate each other and communicate via secure channels. This can be achieved using a public key cryptosystem or a Diffie-Hellman key exchange protocol. The purpose of the group will depend on the specific application, and one of these may be in the formation of congresses.

Each participant in the scheme is required to generate secret keys that are derived from cryptographically secure pseudo random number generators (CSPRNG) with an adequate source of entropy.

Establishing the Group

Figure 6A:
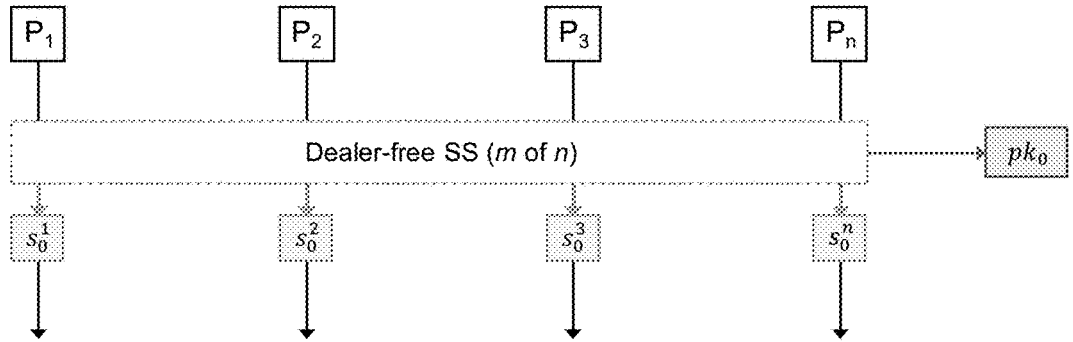

FIG. 6(a) represents the group initially generating a shared polynomial and an associated shared public key, as described above. An optional additional verification step can be performed to ensure the validity of the individual shares.

The group has a number (n) of participants ($P_i$:$P_1$, $P_2$, $P_3$, ..., $P_n$), who establish secure communication channels, and all agree on the threshold (m) and the address pattern Str (a Base58 string). The address pattern is the answer ($A_c$) being sought.

Each participant ($P_i$) generates a degree m−1 polynomial with random coefficients: $f_i(x)$. Each participant $P_i$ sends the value of $f_i(j)$ to each other participant (j=1, ..., n). Each participant then sums all the received values, with their own value of $f_i(i)$), to obtain their secret share $s_0^i$=f(i), wherein:

$$f(i) = \sum_{j=1}^{n} f_j(i)$$

The corresponding shared public key ($pk_0$) is then computed and verified by all participants using Lagrange interpolation, as described above.

At this point, each participant now has their initial secret share ($s_0^i$) and the initial shared public key ($pk_0$). The shared public key ($pk_O$) established by the group is used by each participant during the task. The shared key ($sk_O$) is not calculated and not used. It is important to note, however, that although the shared key is ($sk_O$) is not calculated, each participants share of the shared secret ($s_0^i$) and the shared public key is used to determine a solution (S). The process is described below.

Parallel Searching

Figure 6B:
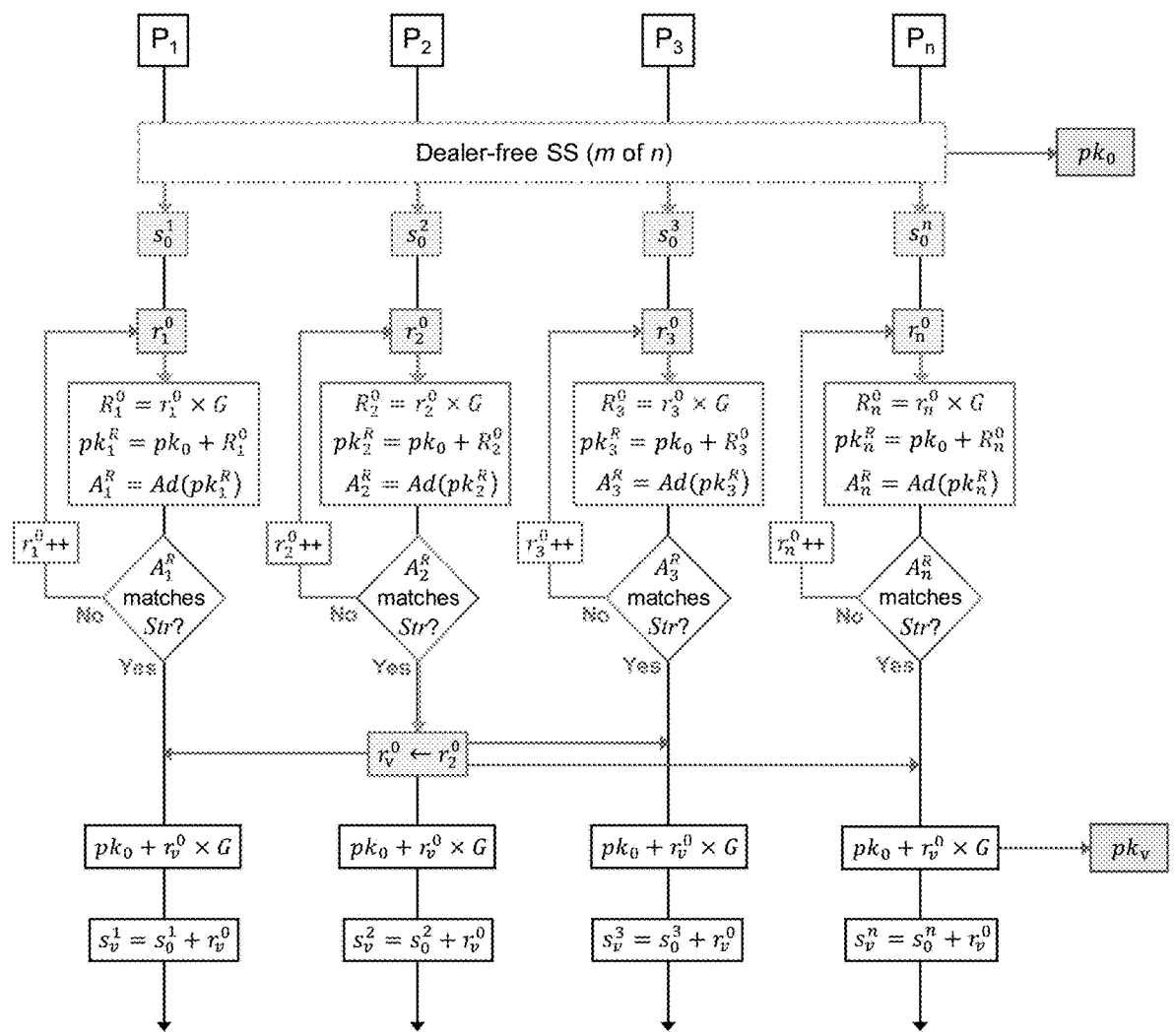
FIG. 6b is a flow chart indicating how the participants determine an address using the calculations shown in FIG. 5.

The task to be performed is shown in FIG. 5 and discussed above. The group then perform a search for the specified pattern in parallel, in the sequence shown in FIG. 6(b).

Each participant $P_n$ generates a random number $r_i^0$, which is a search seed (to prevent overlap of search space between participants). The random number $r_i^0$, in this example, is a secret key from which an address is to be derived.

Then, each participant $P_i$ calculates an elliptic curve point number $R_i^0$ from the search seed according to:

$R_i^0 = r_n^0 \times G$, wherein G is an elliptic curve generator and when multiplied by the secret key $r_n^0$ a temporary public key $R_i^0$ established.

The shared public key $pk_0$ is used to determine a new public key share $pk_i^R$ according to:

$pk_i^R = pk_0 + R_i^0$.

The new public key share $pk_i^R$ is converted to a Base58 address $A_i^R$, according to $A_i^R = Ad(pk_i^R)$ The participant then checks whether the Base58 address $A_i^R$ matches the answer ($A_c$), i.e. that it contains or begins with the specified pattern Str. In other words, has the random number $r_i^0$ lead to an address that begins with the pattern sought.

If there is no match, then the random number $r_i^0$ seed number (the secret key) is incremented e.g. increasing $r_i^0$ by 1 bit and the process is repeated by calculating another secondary random number $R_i^0$ (the temporary public key) from the search seed, determining another new public key by adding the original public key and the temporary public key and converting it to a Base58 address and checking whether it matches the specified pattern Str.

If the Base58 address $A_i^R$ contains or matches the specified pattern Str then the participant broadcasts the solution, which is the seed number $r_i^0$ that enabled the answer to be determined, said seed number or secret key subsequently referred to as the vanity seed number $r_v^0$.

Once another participant receives a broadcast $r_v^0 = r_i^0$ from another group member, they can verify that the secret key corresponds to an address having the target text string (Str) by multiplying it by the elliptic curve generator (×G) and adding the original shared public key ($pk_O$).

Using the original shared public key the group then calculates a new shared public key $pk_v$ that corresponds to the vanity address sought according to $pk_v = pk_0 + r_v^0 \times G$ The creation of a temporary public key share using a seed number (a secret key), said temporary public key leading to the creation of a new public key when a solution (the secret key that can determine an answer) is found, enables the group to work quickly and efficiently in parallel without the need to generate a new shared public key at each step taken by a participant. Each participant can share their progress with others without limitation and only when a solution is found is a new shared public key established.

Updating the Secret Share

Each participant $P_i$ now has their initial secret share $s_0^i$, shared public key $pk_0$ and $r_i^0$, which led to an address containing the desired text string. To update their secret shares, each participant simply adds $r_v^0$ to the value:

$s_v^i = s_0^i + r_v^0$ wherein $r_v^0$ is the secret key that led to the answer.

Figure 7:
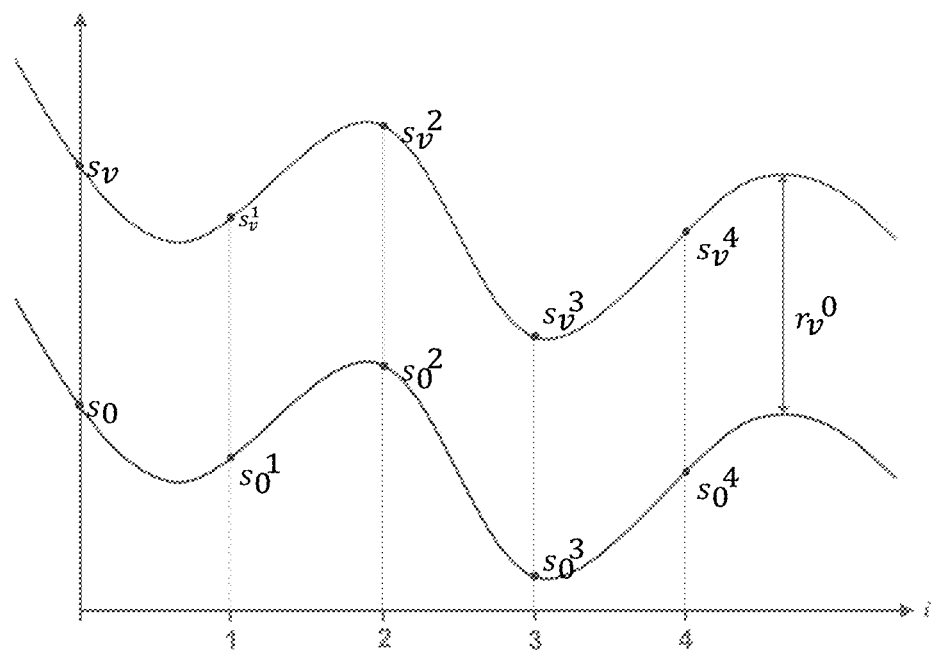
FIG. 7 illustrates the logic of updating key shares on a secret sharing polynomial.

A threshold (m) of the updated shares $s_v^i$ will then be able to reconstruct the full secret key $sk_v$ corresponding to the new shared public key that corresponds to the vanity address sought, according to $pk_v = pk_0 + r_v^0 \times G$, and by using Shamir's scheme. This arises from the polynomial arithmetic, wherein adding a constant to all secret (non-zero x) points will increase the interpolated zero-point (the secret) by that same constant, as illustrated in FIG. 7.

Although all participants can establish the new shared public key independently, they must work together to create the corresponding private key, or generate a valid digital signature, which is required access or unlock any resource secured by the old or the new shared public key.

Validation

To confirm and validate the new secret shares, the group performs the procedure to generate new shared public key $pk_v$ using their new secret shares ($s_v^i$) as described above in relation to a corresponding shared public key ($pk_0$) that was the computed and verified by all participants using Lagrange interpolation, said public key shares having been broadcast to all participants and the shared public key ($pk_v$) is then calculated simply as the sum of any t+1 shares, according to $$pk_v = \sum_{i=1}^{t+1} b_i s_i \times G$$

Each participant can verify that all the public key shares received are consistent.

Process Overview

Participants form a group and a shared public key ($pk_O$), which is the 'original' shared public key. The original shared public key was established from each participant's share of a corresponding shared secret key and each participant's share of the original shared public key. It is to be noted that a shared secret key is not established, and does not need to be established.

The group are set a task, which may be set by a third party. In exchange for the solution to the task a resource or reward is offered or available. When the solution is found the resource or reward can be secured by a new shared public key, said key being established using the solution. Accessing or unlocking the resource or reward requires the group to collaborate and generate a corresponding new shared private key.

By way of example the task is the determination of a vanity address in exchange for a financial reward. The address sought can be considered as the answer to a task and is a predetermined (by a client) pattern or text-string. The solution is the proof of that task.

Individually, and in parallel, each participant generates a temporary secret key, which functions as a seed, and determines whether that seed leads to the address sought. If not, the seed is incremented and the determination repeated until one of the participants identifies a temporary secret key for an address having the desired text-string.

During the determination, the temporary secret key is converted by each participant to a public key (temporary) for their own use in the determination, which is then added to the original shared public key, the summed public keys are added to make a combined public that is hashed to determine whether the address produced contains the text-string sought.

Using a further public key, temporarily and for their own use, enables the participants to operate independently of the original shared public key thus overcoming the burden of having to create a new shared public key at each step.

When one of the participants identifies a temporary secret key for an address having the desired text-string they share it with the others, who then check that the secret key derived from the further public key is the solution that leads to the address sought.

If the secret key derived from the further public key is the solution then a new shared public key—the validated or 'vanity' key—is created by the participants in the same manner as they established the original shared public key.

An asset or reward can be secured by the new shared public key, which can be unlocked by the solution. The asset can be a procedural step and function, for example, to close a stage in process, such as the completion of a task shown in FIG. 1. In this way the group can collaborate to access or unlock an asset, or obtain a reward—they use the solution to do so.

In this example, for the purposes of illustrating the unlocking of an asset, the new shared public key is used to determine a new shared public address for the receipt of a Bitcoin or other cryptocurrency payment.

This payment can only be accessed using the corresponding shared secret or private key. The shared secret key required to unlock an unspent transaction (UTXO) does not exist until all the participants or a threshold number of participants create a shared secret key.

The new shared secret key is created from each participants secret key share, which is a summation of their original secret key shared (used to create the original shared public key) and the secret key (the solution) that determined the address having the desired text-string (which was used to create the new shared public key).

The process is trust-less because the secret shares underlying the original shared public key are not only used to establish the solution (secret key) but are unknown to the other participants. To be clear, at any one time no shared secret key can be established without at least a threshold of shares i.e. m participants' secret shares. This applies to the original shared secret key (not determined in this process) and the new shared secret key, which is based upon the solution.

Initially, the shared public key establishes a reference point for the trust-less collaboration and by using the shared public key as starting point, and generating a new shared public key using the solution, neither the secret shares that created the shared public key nor the secret shares (solution) that provide the new shared private key are known without collaboration.

Inhibiting Abuse in the Collaboration

Trust-less collaborations are susceptible to abuse in the form of free-riding, wherein one or more participants deliberately contribute little or nothing to the determination of the solution of the task and expect to obtain an equal allocation or fair share of the allocated rewards. The reward can be monetary or can be the allocation of a subsequent resource, such as a computing processing resource or energy supply.

In threshold groups that are formed from anonymous participants they are economically incentivised to not perform the search and do not actively participate in the determining a solution to the task, or do not commit commensurate computational resources to the task.

To address this problem, participants are allocated shares of the reward, such allocations being proportional, or at least indicative, of the computational resource applied to the task. The actual number or percentage of allocations each participant receives for the resource they utilise can be established in advance. The mechanism for measuring the resource applied to the task can assess of the difficulty level of the actions taken by each participant in attempting to determine a solution to the task. A measurement, or indication of the resource applied, can provide evidence that a particular participant have performed the task or search at a given rate. Sub-measurements or sub-indications can be used to indicate the difficulty level. A difficulty level can be determined from a partial result, or partial solution to the task.

By way of example, and using the determination of a vanity address, the group of participants can agree on how an allocation, or percentage of the share, is to be determined. If, for example, the answer being sought was a secret key corresponding to an address "1Bitcoin" then it can be agreed that finding a public key share that produces a sub-string of the agreed pattern e.g. "Bitco" is indicative of a certain level of computational resource being applied.

During the parallel search, each participant individually performs the search for an address beginning with "1Bitcoin" and when a participant finds a temporary public key share corresponding to an address with the sub-string pattern, they broadcast the random number, or nonce, $r_i^0$ that was used to generate said temporary public key share the to the rest of the group. The other participants can verify each received nonce $r_i^0$: i.e. that the address derived from $pk_i^R = pk_0 + r_i^0 \times G$ matches the sub-string pattern and keep a record of the number of valid nonces $r_i^0$ received from each other participant $P_i$.

It is to be noted that the expected frequency of a received valid nonce $r_i^0$ from each participant $P_i$ will be proportional to their computational (search) effort, and inversely proportional to the difficulty of the sub-string pattern. By way of example, a threshold group of 20 participants searching for an address pattern '1Bitcoin' (difficulty $8.7 \times 10^{13}$) with standard CPUs would be expected to find a solution in a few hours. However, each participant would be expected to produce and broadcast a $r_i^0$ value matching the sub-string address pattern '1Bitco' (difficulty $2.6 \times 10^8$) about every 4 minutes. Any participant not providing valid $r_i^0$ values with approximately this frequency can be penalised by the remainder of the group, for example by charging congress fees or excluding them from the group (by re-performing the dealer-free secret sharing).

Computing Environment

Figure 8:
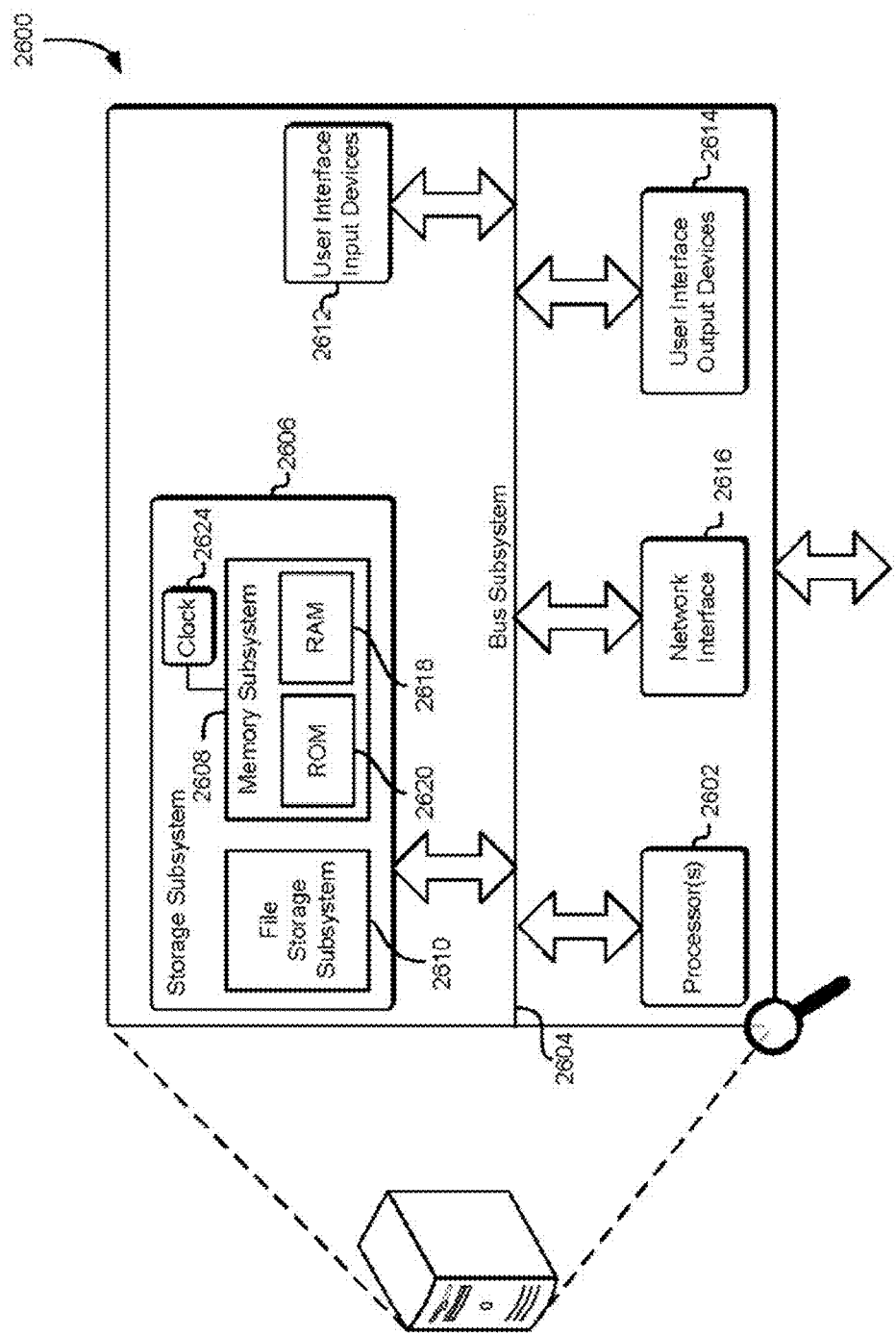
FIG. 8 is a schematic diagram illustrates a computing environment in which various embodiments can be implemented.

FIG. 8 is a schematic diagram illustrates a computing environment in which various embodiments can be implemented. There is provided an illustrative, simplified block diagram of a computing device 2600 that may be used to practice at least one embodiment of the present disclosure. In various embodiments, the computing device 2600 may be used to implement any of the systems illustrated and described above. For example, the computing device 2600 may be configured for use as a data server, a web server, a portable computing device, a personal computer, or any electronic computing device. As shown in FIG. 8, the computing device 2600 may include one or more processors with one or more levels of cache memory and a memory controller (collectively labelled 2602) that can be configured to communicate with a storage subsystem 2606 that includes main memory 2608 and persistent storage 2610. The main memory 2608 can include dynamic random-access memory (DRAM) 2618 and read-only memory (ROM) 2620 as shown. The storage subsystem 2606 and the cache memory 2602 and may be used for storage of information, such as details associated with transactions and blocks as described in the present disclosure. The processor(s) 2602 may be utilized to provide the steps or functionality of any embodiment as described in the present disclosure.

The processor(s) 2602 can also communicate with one or more user interface input devices 2612, one or more user interface output devices 2614, and a network interface subsystem 2616.

A bus subsystem 2604 may provide a mechanism for enabling the various components and subsystems of computing device 2600 to communicate with each other as intended. Although the bus subsystem 2604 is shown schematically as a single bus, alternative embodiments of the bus subsystem may utilize multiple busses.

The network interface subsystem 2616 may provide an interface to other computing devices and networks. The network interface subsystem 2616 may serve as an interface for receiving data from, and transmitting data to, other systems from the computing device 2600. For example, the network interface subsystem 2616 may enable a data technician to connect the device to a network such that the data technician may be able to transmit data to the device and receive data from the device while in a remote location, such as a data centre.

The user interface input devices 2612 may include one or more user input devices such as a keyboard; pointing devices such as an integrated mouse, trackball, touchpad, or graphics tablet; a scanner; a barcode scanner; a touch screen incorporated into the display; audio input devices such as voice recognition systems, microphones; and other types of input devices. In general, use of the term "input device" is intended to include all possible types of devices and mechanisms for inputting information to the computing device 2600.

The one or more user interface output devices 2614 may include a display subsystem, a printer, or non-visual displays such as audio output devices, etc. The display subsystem may be a cathode ray tube (CRT), a flat-panel device such as a liquid crystal display (LCD), light emitting diode (LED) display, or a projection or other display device. In general, use of the term "output device" is intended to include all possible types of devices and mechanisms for outputting information from the computing device 2600. The one or more user interface output devices 2614 may be used, for example, to present user interfaces to facilitate user interaction with applications performing processes described and variations therein, when such interaction may be appropriate.

The storage subsystem 2606 may provide a computer-readable storage medium for storing the basic programming and data constructs that may provide the functionality of at least one embodiment of the present disclosure. The applications (programs, code modules, instructions), when executed by one or more processors, may provide the functionality of one or more embodiments of the present disclosure, and may be stored in the storage subsystem 2606. These application modules or instructions may be executed by the one or more processors 2602. The storage subsystem 2606 may additionally provide a repository for storing data used in accordance with the present disclosure. For example, the main memory 2608 and cache memory 2602 can provide volatile storage for program and data. The persistent storage 2610 can provide persistent (non-volatile) storage for program and data and may include flash memory, one or more solid state drives, one or more magnetic hard disk drives, one or more floppy disk drives with associated removable media, one or more optical drives (e.g. CD-ROM or DVD or Blue-Ray) drive with associated removable media, and other like storage media. Such program and data can include programs for carrying out the steps of one or more embodiments as described in the present disclosure as well as data associated with transactions and blocks as described in the present disclosure.

The computing device 2600 may be of various types, including a portable computer device, tablet computer, a workstation, or any other device described below. Additionally, the computing device 2600 may include another device that may be connected to the computing device 2600 through one or more ports (e.g., USB, a headphone jack, Lightning connector, etc.). The device that may be connected to the computing device 2600 may include a plurality of ports configured to accept fibre-optic connectors. Accordingly, this device may be configured to convert optical signals to electrical signals that may be transmitted through the port connecting the device to the computing device 2600 for processing. Due to the ever-changing nature of computers and networks, the description of the computing device 2600 depicted in FIG. 8 is intended only as a specific example for purposes of illustrating the preferred embodiment of the device. Many other configurations having more or fewer components than the system depicted in FIG. 8 are possible.

Summary

Today's blockchain relies heavily on computational effort, whether for mining or the determination of a vanity address. It can be advantageous to distribute the computational tasks across a group to make use of their collective computational processing power.

The solution described in this specification uses the determination of a vanity address to demonstrate improved secure collaboration techniques that enable more efficient collaboration in a trust-less or dealer-free system.

It is to be noted that although a vanity address is, theoretically, as secure as any other address, the use of a distinctive address makes it harder for fraudsters to provide substitute addresses that could deceive and lead to a payment being made in to a different account. By presenting machine readable code in a user-friendly human-readable format, or pattern, minimises this risk. Each character in a vanity address is selectable from 58 different characters. The frequency of the pattern "1B" in an address is 1 in 58. Each additional character decreases the frequency by a factor of 58 (1 in 3364). Replicating a vanity address gets more difficult, by a factor of 58, for each new character added to the string thus making longer addresses more secure.

Collaborating in a dealer-free pool according to the invention enables the pool to operate together securely and efficiently—in a completely parallel way—enabling rapid solutions without relying on a third party and without any loss of security.

Dealer-free generation of a shared public key only needs to be performed once, and each participant can independently search for a satisfying vanity address. Once found, the individual key shares of the group participants are updated to correspond to the full shared address.

Abuse, or free-riding is also inhibited by a regular secure and trust-less means of sharing progress, or resource applied, on the computational task It should also be noted that the above-mentioned embodiments and examples illustrate rather than limit the invention, and that those skilled in the art will be capable of designing many alternative embodiments without departing from the scope of the invention as defined by the appended claims. In the claims, any reference signs placed in parentheses shall not be construed as limiting the claims. The word "comprising" and "comprises", and the like, does not exclude the presence of elements or steps other than those listed in any claim or the specification as a whole. In the present specification, "comprises" means "includes or consists of" and "comprising" means "including or consisting of". The singular reference of an element does not exclude the plural reference of such elements and vice-versa. The invention may be implemented by means of hardware comprising several distinct elements, and by means of a suitably programmed computer. In a device claim enumerating several means, several of these means may be embodied by one and the same item of hardware. The mere fact that certain measures are recited in mutually different dependent claims does not indicate that a combination of these measures cannot be used to advantage.

REFERENCES

1. [Vanitygen 2016] https://en.bitcoin.it/wiki/Vanitygen
2. [Addr 2016] https://en.bitcoin.it/wiki/Technical_background_of_version_1_Bitcoin_addresses
3. [Base58 2016] https://en.bitcoin.it/wiki/Base58Check_encoding
4. [Shamir 1979] Shamir, Adi. "How to share a secret." Communications of the ACM 22.11 (1979): 612-613.
5. [Nojourmian 2013] Nojoumian, Mehrdad, and Douglas R. Stinson. "On dealer-free dynamic threshold schemes." Adv. in Math. of Comm. 7.1 (2013): 39-56
6. [Goldfeder 2015] Goldfeder, Steven, et al. "Securing Bitcoin wallets via a new DSA/ECDSA threshold 1 signature scheme."
7. [SEC 2010] Standards for Efficient Cryptography (SEC)—Certicom Research, http://www.secg.org/sec2-v2.pd
8. [JoelKatz 2012] https://bitcointalk.org/index.php?topic=81865.msg901491#msg901491

A Bitcoin Developer Reference is retrievable from http://bitcoin.org/en/developer-reference.

The invention claimed is:

1. A computer-implemented method comprising:
   establishing or joining a group of participants;
   determining, by the group of participants, an elliptic curve generator (G) and an output pattern;
   determining, by each participant, a respective secret share of a shared secret key based on a set of values provided by the group, wherein each participant of the group of participants provided a respective value to the set of values;
   broadcasting, by each participant, a respective public key share calculated using the respective secret share and said elliptic curve generator;
   summing the public key shares to provide a shared public key:
   verifying the public key based on the determined secret share;
   performing, by the group of participants, a search for the output pattern in parallel, comprising by multiplying a first random number by the elliptic curve generator to generate a temporary public key, and determining a new public key by adding the temporary public key to the public key;
   checking whether the new public key is indicative of matching the output pattern, wherein when the new public key is not indicative of matching the output pattern, the search is repeated using a second random number;
   sending, when the new public key is indicative of matching the output pattern, the first random number to the group of participants; and verifying, by each participant of the group of participants, that the new public key is indicative of matching the output pattern by multiplying the first random number by the elliptic curve generator and adding the public key.

2. The computer-implemented method according to claim 1, further comprising:
receiving, from a client (C) or participant (P), the output pattern and a client public key ($pk_c$) derived from a client's secret key ($sk_c$), wherein the client's public key is used in generating the output pattern.

3. The computer-implemented method according to claim 1, wherein the output pattern requires at least one group member to find a solution that, when processed, produces a Cryptocurrency address having a specified pattern.

4. The computer-implemented method according to claim 1, wherein the output pattern originates from a third-party or another participant, and wherein the third-party generated a third-party secret key ($sk_c$) and provides to the group a corresponding third party public key ($pk_c$), wherein $pk_C=sk_C \times G$, and G is the elliptic curve generator, and receiving the third party public key ($pk_c$), and determining the output pattern using the third party public key ($pk_c$) with an incremental variable (i) used for regenerating the new public key, such that $pk=pk_C+i \times G$ when the output pattern is determined, sending to the third-party the incremental variable (i) that enabled determination of the solution, such that the third party can verify the solution using their random secret key ($sk_c$)

$$sk=sk_C+i,$$

where pk=sk×G due to elliptic curve point multiplication.

5. The computer-implemented method according to claim 1, wherein the group of participants generate a secret corresponding to a collection of secret shares including the secret share through a secure multiparty computation (MPC).

6. The computer-implemented method to claim 1, wherein the public key is established amongst the group using Shamir's secret sharing scheme.

7. The computer-implemented method according to claim 1, wherein the output pattern is received from a client (C) or participant (P), said output pattern being to find a private key for a Cryptocurrency address having a specified pattern therein.

8. The computer-implemented method according to claim 1, the method further comprises sharing, with the group one or more intermediate results that are demonstrable of a computational resource applied to the output pattern.

9. The computer-implemented method according to claim 8, wherein the one or more intermediate results correspond to a portion of the output pattern.

10. The computer-implemented method according to claim 8, wherein the one or more intermediate results have a proportional level of difficulty, and one or more participants assess a computational resource applied by a fellow participant based on a frequency and/or the difficulty of intermediate results submitted.

11. A computer-readable storage medium comprising computer-executable instructions that, when executed, configure a processor to perform the computer-implemented method of claim 1.

12. An electronic device comprising:
an interface device;
one or more processor(s) coupled to the interface device; and
a memory coupled to the one or more processor(s), the memory having stored thereon computer executable instructions which, when executed, configure the one or more processor(s) to perform the method of claim 1.

13. A hardware node of a blockchain network, the node configured to perform the method of claim 1.

14. A blockchain network having a hardware node according to claim 13.

* * * * *